UNITED STATES PATENT OFFICE.

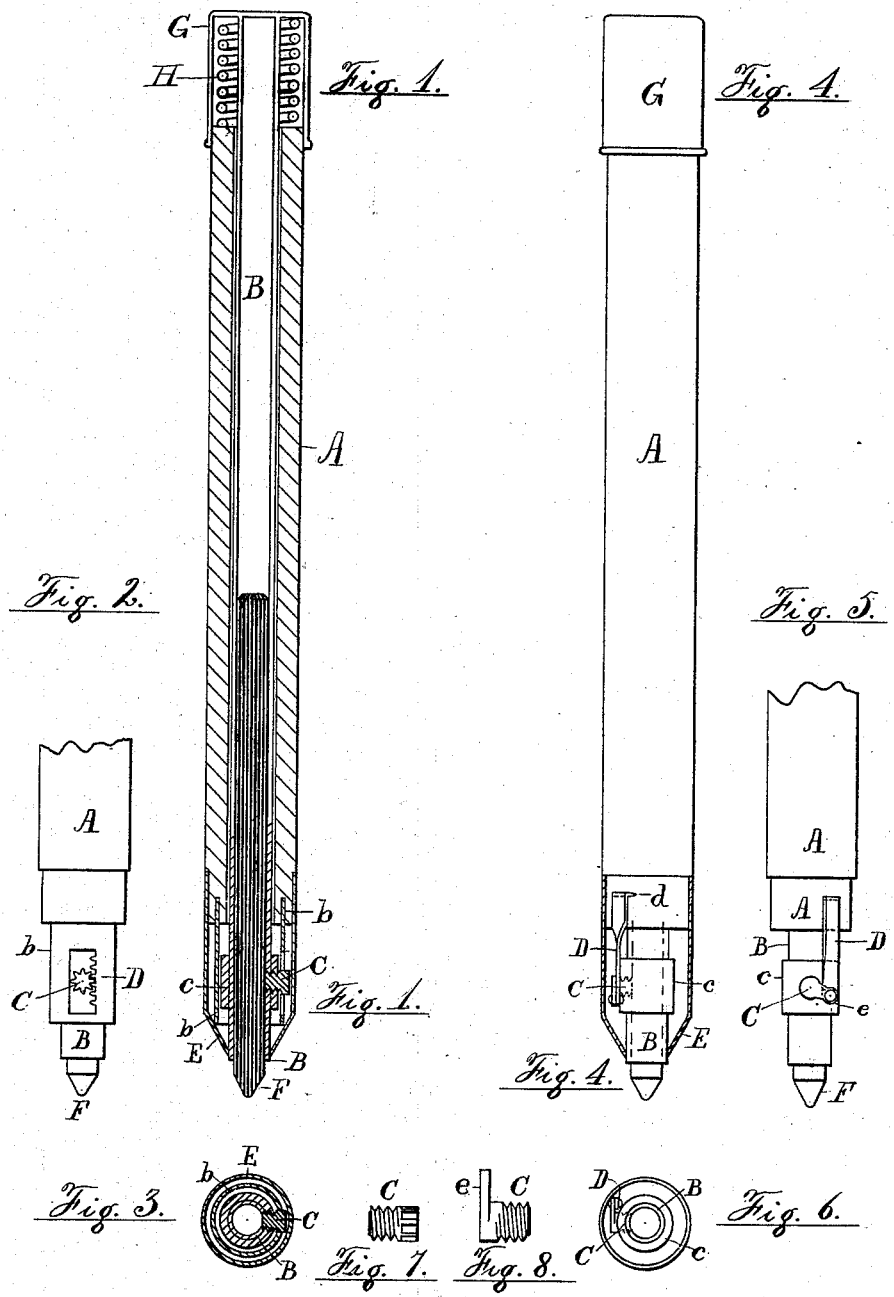

GEORGE B. ADAMS, OF NEWARK, ASSIGNOR OF ONE-HALF TO THOMAS S. CRANE, OF EAST ORANGE, NEW JERSEY.

LEAD AND CRAYON HOLDER.

SPECIFICATION forming part of Letters Patent No. 270,197, dated January 9, 1883.

Application filed September 7, 1882. (No model.)

*To all whom it may concern:*

Be it known that I, GEORGE B. ADAMS, a citizen of the United States, residing in the city of Newark, county of Essex, and State of New Jersey, have invented certain new and useful Improvements in Lead and Crayon Holders, fully described and represented in the following specification and the accompanying drawings, forming a part of the same.

This invention consists in the combination, with the lead-tube, of a set-screw for clamping the lead, and means for rotating the screw by the longitudinal movement of the lead-tube relative to the holder or some attachment thereof.

In the drawings annexed, two different constructions for carrying out my invention are shown, and others may be devised to operate within the principle I have described.

Figure 1 is a longitudinal section of a holder provided with my improvements. Fig. 2 shows the lower end of the same with the nozzle removed. Fig. 3 is a section of the same. Fig. 4 is a side view of a holder having a different construction for the screw-turning devices, the nozzle being shown in section. Fig. 5 is a view of the same at right angles to the position shown in Fig. 4, the nozzle being omitted. Fig. 6 is an end view of the part shown in Fig. 5. Fig. 7 is an enlarged view of the set-screw shown in Fig. 1, and Fig. 8 is a similar view of the one provided with a crank in Fig. 5.

The principle of the invention consists in providing a set-screw in the side of the lead-tube near its point, and in combining with the holder a connection to the head of the screw, whereby the latter may be turned when the lead tube and holder are moved longitudinally in relation to one another.

A is the holder; B, the lead-tube; C, the screw; D, the connection between the holder and the head of the screw, and E the nozzle applied to the tip of the holder to cover the set-screw and its turning devices. F is the lead; G, a cap applied to the rear end of the lead-tube, and H a spring arranged within the cap to retract the lead-tube and automatically turn the screw C to clamp the lead.

To afford the screw a suitable nut, a collar, c, is applied to the lead-tube near the point, and a tapped hole formed through the same, as shown in Fig. 1.

In Figs. 1 to 3 the head of the screw is shown formed with gear-teeth, and the connection with the holder A consists in a rack of teeth meshing into those upon the head of the screw, so that the screw will be turned if either the holder or lead-tube be moved longitudinally.

The rack is formed by cutting a slot in an auxiliary tube, b, and inserting the same a little way into the end of the holder, where it is retained by the nozzle E, which is secured to the end of the holder in any convenient manner. Teeth being cut in one edge of the slot, the head of the screw is turned as it moves in contact with the teeth and the smooth opposite edge of the slot, as shown in Fig. 2.

Figs. 4 to 6 show an alternative form for the connection between the holder and screw-head, the latter being provided with a crank or lever-arm, e, and the connection consisting in a link pivoted to the end of the crank and fastened by its opposite extremity to the holder. The latter is shown in all the drawings as made of wood, and the link is shown as formed with a prong, d, which may be forced into the wood at such a point as to be retained in place by the nozzle where the latter is secured over the end of the holder. The operation of either construction is the same, the screw being turned to release the lead when the lead-tube is forced forward by pressure upon the cap G, and the spring H serving to retract the tube and automatically clamp the lead when the pressure is removed.

The lead-tube may, if preferred, be secured in the holder or made integral therewith, and the connection D in either form be secured to a sliding nozzle, so that a spring within the nozzle would operate to automatically move it lengthwise of the holder and turn the screw to clamp the lead.

Having shown two different constructions for the connection between the screw-head and holder, it is obvious that others might be devised, and I do not, therefore, limit myself to the particular constructions shown, but claim my invention as set forth.

I am fully aware that the movable lead-tube is old, as well as the spring H, the same being shown in a dental hand-piece patented as No. 213,167, on March 11, 1879, and in other constructions, and being now public property. I do not, therefore, claim them separately; but

I claim the combinations I have devised as follows:

1. The combination, in a lead and crayon holder, of a lead-tube provided with a set-screw for clamping the lead, and means, substantially as described, for automatically rotating the set-screw, as and for the purpose set forth.

2. The combination, with a holder and lead-tube movable in respect to one another and provided with a spring for retracting the lead-tube, as described, of a set screw for clamping the lead in the tube, and a connection between the head of the set-screw and the holder, as herein set forth.

3. The combination, with a lead-tube provided with a set-screw having a cogged head, as described, of a holder having a rack for moving the set-screw, substantially as shown and described.

In testimony whereof I have hereunto set my hand in the presence of two subscribing witnesses.

GEO. B. ADAMS.

Witnesses:
C. C. HERRICK,
THOS. S. CRANE.